United States Patent
Kliewe

(10) Patent No.: US 6,941,544 B2
(45) Date of Patent: Sep. 6, 2005

(54) SYSTEM AND METHOD FOR COMPUTER FILE TAILORING

(75) Inventor: John Kliewe, Stamford, CT (US)

(73) Assignee: International Business Machines Corporation, Armonk, NY (US)

(*) Notice: Subject to any disclaimer, the term of this patent is extended or adjusted under 35 U.S.C. 154(b) by 614 days.

(21) Appl. No.: 09/981,875

(22) Filed: Oct. 18, 2001

(65) Prior Publication Data

US 2003/0084070 A1 May 1, 2003

(51) Int. Cl.[7] .............................................. G06F 9/44
(52) U.S. Cl. ....................................... 717/115; 717/120
(58) Field of Search .......................... 717/115, 120–123

(56) References Cited

U.S. PATENT DOCUMENTS

| | | | |
|---|---|---|---|
| 5,349,657 A | 9/1994 | Lee | 717/125 |
| 5,390,314 A | 2/1995 | Swanson | 717/138 |
| 5,724,559 A | 3/1998 | Masemore | 703/26 |
| 6,131,190 A | 10/2000 | Sidwell | 717/115 |
| 2002/0069199 A1 * | 6/2002 | Kang | 707/9 |

OTHER PUBLICATIONS

IBM, ABOUT.1 OS/390 V2R10.0 TSO/E REXX Reference Who should Read This Book, Oct. 2000, IBM Library Server.*

"SHARE Session 2819: Introduction to OS/390 REXX", by Lionel B. Dyck, 18 pages, publication date unknown, downloaded from http://www.lbdssoftware.com/RexxIntro.pdf, on Sep. 20, 2001.

"search390.com Definitions: REXX", downloaded from http://www.whatis.com on Mar. 22, 2004.

"Chapter 2: Description of ISPF Services", "ISPF Services Guide", published by IBM Corp., pp. 66–73.

"Chapter 9: Defining File–Tailoring Skeletons", Dialog Developers Guide and Reference, published by IBM Corp. 1980 and 1985, pp. 325–334.

* cited by examiner

*Primary Examiner*—Antony Nguyen-Ba
(74) *Attorney, Agent, or Firm*—Robert H. Frantz; David A. Mims, Jr.

(57) ABSTRACT

An enhancement and preprocessor to native file tailoring functions such as ISPF's File Tailor utilities. A set of control parameters and input data is processed according to specified options to prepare one or more tables of data compatible with the native file tailoring functions, and the native file tailoring functions are called one or more times to achieve the desired tailored files. Use of the invention obviates the need for custom programming or manual file editing to format source data into one or more tables which are compatible with the input requirements of the native file tailoring functions.

14 Claims, 5 Drawing Sheets

*Prior Art*

SYSTEM AND METHOD FOR COMPUTER FILE TAILORING

CROSS-REFERENCE TO RELATED APPLICATIONS (CLAIMING BENEFIT UNDER 35 U.S.C. 120)

Not applicable.

FEDERALLY SPONSORED RESEARCH AND DEVELOPMENT STATEMENT

This invention was not conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to technologies and methods for modifying, deleting, merging and otherwise processing text-based computer files on a mass scale in environments such as database management and web site management.

2. Description of the Related Art

Many companies operate large-scale computing facilities which house great amounts of data in files and database records, including inventory information, financial transaction information, customer orders, etc. Most of these systems are based upon "main frame" class computers and storage solutions, such as the S/390 computer from International Business Machines ("IBM"), and much of this information is stored in a "text" format, such as ASCII text files, Hyper Text Markup Files ("HTML"), and the like.

To manage these types of data stores, most main frame computers are equipped with various software tools, some of which are supplied with or integral to the operating system, and some of which are available separately as a "stand alone" utility function. For example, IBM's OS/390, which is the operating system run on the S/390 computer, is provided with a user interface called "Interactive System Productivity Facility" ("ISPF"), which allows the user to maintain and configure the system (e.g. file deletions, file opens, file creations).

Many tasks performed in these computing environments require creating and handling of redundant text data, which must either be entered manually, copied from libraries, or require a highly specialized program to be written explicitly for the task. For example, a web site administrator may want to perform a similar update to a block of HTML in 1200 files which comprise a company web site, such as changing all references to the company's address and telephone. The administrator can either manually change all 1200 files, write a program to make the changes, or use an operating system utility (if available) to make the changes.

Among its many features, ISPF provides a utility called the File Tailoring Function ("FTF"), which provides a means of text generation and modification on a large-scale basis (e.g. hundreds to thousand of records or files to be modified). While this addresses the redundant text management issue to some degree, FTF has some limitations to its use. A main limitation to the ISPF FTF utility is that it only accepts input in one specific database or tabular format. As a consequence of this limitation, administrators who wish to use the FTF utility must first build a plurality of tables containing the text to be modified for input to FTF, regardless of what will be generated by the FTF (generating text or HTML files, program code, database tables all requires input in a tabular form). In general, this would be too great of a task to be handled manually, so the administrator is forced to write a unique "preprocessing" program to format the input data into the requisite tabular format.

Another FTF limitation lies in the batch processing (e.g. performing the same or similar tasks on different sets of data at a single time) capabilities of the FTF utility. If the user wishes to perform several similar operations, for example, delete several files from the same directory according to some logical conditions (e.g. delete all files whose name begins with the string "abc"), the table of inputs (the file path and name) must be updated after each file is deleted to hold the name of a new file to be deleted, and then FTF must be rerun.

Therefore, batch operations can be very difficult to implement and time-consuming to execute. For more complex operations, extensive table modifications (via cut/copy/paste or query replace) and an overwhelming number of repetitive calls to FTF may be required.

To simplify this task, many users utilize JCL (Job Control Language), which manages and organizes jobs sent to the operating system, to automate the execution process. Unfortunately, this requires a unique JCL script to be written for each task, which, although resulting in an improvement on a case-by-case basis, remains time-consuming and inefficient when considered on a larger scale. For example, an administrator who wishes to merge certain records from certain databases, extract other records into separate files, and delete other files, may first open an existing JCL file which was previously created for a similar task, edit that JCL file (cut, paste, etc.), and save that JCL file under a new name for use in this operation. This is more efficient than writing new JCL for every task, but also can become cumbersome to manage (e.g. remember) the details of each old JCL file thereby increasing the possibility of errors in the processing on a wholesale basis.

This common practice is illustrated in FIG. 1 for an OS/390 and ISPF environment. Similar actions and tasks are undertaken on other computers and operating systems, wherein the terminology may differ but the concepts and actions are essentially the same. In the ISPF environment, data items are organized as members of a Partition Data Set ("PDS"). In another environment, such as a computer running a Microsoft Windows [TM] operating system, this organization may be referred to as "files" organized into "folders" or "directories". These synonymous terminologies are well-known in the art. For the purposes of this disclosure, terminology relevant to the OS/390 and ISPF environments will be primarily used, although synonyms may be provided to enhance understandability as the problem of the present art exists in all available computing environments, not just in the OS/390 environment.

First, a user or administrator would create (11) an ISPF FTF "skeleton" (e.g. output template) which indicates to the FTF utility how the output data is to be formatted (e.g. the objective of the operation).

Next, the user would format the input data (tables, databases, files, etc.) into the requisite table format either manually, or by creating a custom JCL file (12). In some cases, a similar or close set of tables or JCL may already be available, so these may be edited using common cut-and-paste operations (13) instead of creating tables or JCL from scratch.

If custom JCL is being used to preprocess the data, it is run (14) on the data, and then the ISPF FTF utility is invoked on the tabular data. The FTF utility is also supplied with the skeleton as created earlier (11) as one of its inputs.

Then, if (16) more operations are required (e.g. similar operations with minor differences), the tabular input and/or JCL are revised (13), rerun (14), and the ISPF FTF utility is invoked again (15). This loop continues until all operations have been completed successfully on all data items to be "tailored", at which point, the process is complete (17).

Therefore, there is a need in the art for a system and method which allows for consistent generation of text that can be tailored to a wide variety of needs, situations, and applications, whether the text be database records.

BRIEF DESCRIPTION OF THE DRAWINGS

The following detailed description when taken in conjunction with the figures presented herein provide a complete disclosure of the invention.

SUMMARY OF THE INVENTION

The present invention provides a "front-end" interface to the existing file tailoring functions, and especially for the OS/390 ISPF File Tailoring utility. It provides the user with one common method to invoke the ISPF FTF for a multitude of different applications. It creates a single solution to a problem that previously required unique solutions for each instance by using parameters and user-invoked options to calibrate and manage the system.

Each table that was previously updated manually, which is an error-prone process, is now generated automatically by the "FTAILOR" invention. The FTAILOR system then calls ISPF File Tailoring commands to execute the desired operation on the generated tables.

The invention also incorporates logic which allows for complex actions to be performed on the text objects. For example, operations such as deleting all customers from the states Washington, Hawaii and Alaska who haven't purchased an item in six months from a customer database are possible.

While the intended use is for JCL scripts and DB2 commands for database administration, it will be recognized by those skilled in the art that the invention may be applied to other types of bulk text management, such as HTML files of an extensive web site.

DETAILED DESCRIPTION OF THE INVENTION

The present invention is preferably realized in conjunction with the File Tailoring functions of the "Interactive System Productivity Facility" ("ISPF") of IBM's OS/390. However, it will be readily apparent to those skilled in the art that the invention may be used in conjunction with other similar functions of similar operating systems and environments.

Figure 1:
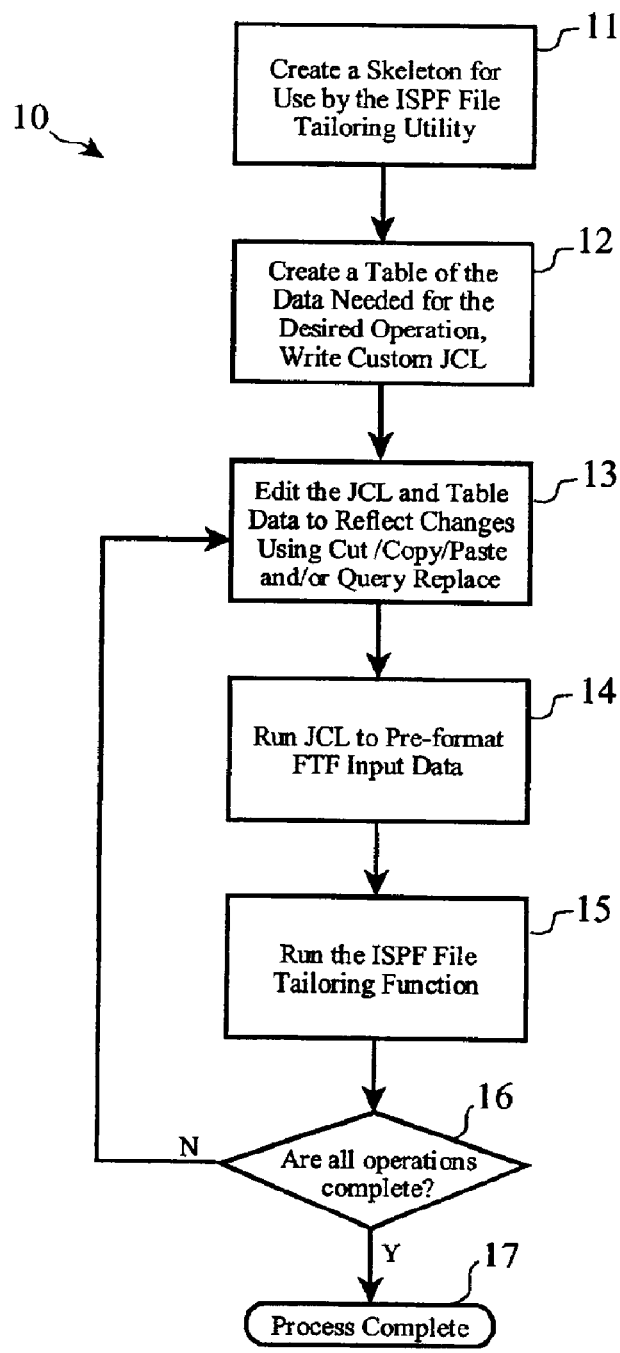
FIG. 1 shows the generally manual process of the prior art for preprocessing data for subsequent file tailoring.
Figure 2:
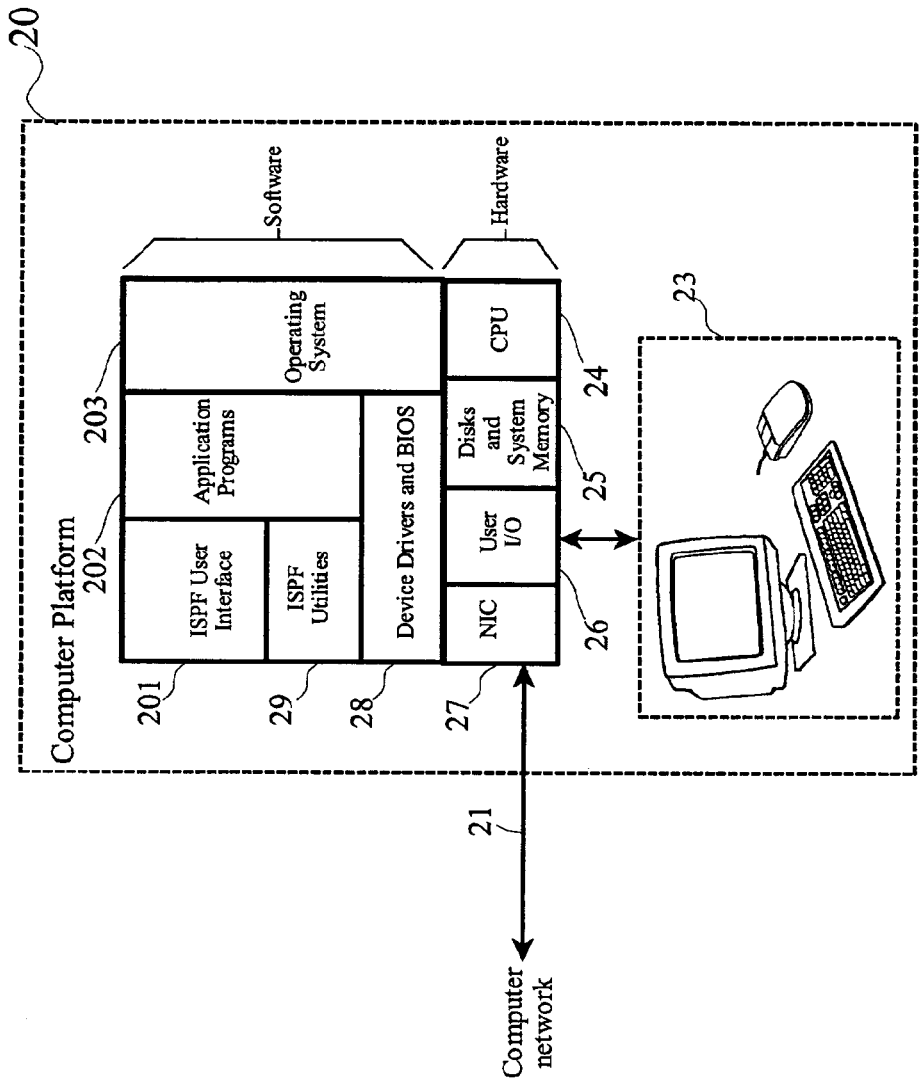
FIG. 2 shows the well known arrangements of components of a main frame computing system.

Turning to FIG. 2, the well-known arrangement of a computing platform is illustrated. The computer platform (20) is typically based upon one or more processors or central processing units (CPU), and is provided with persistent data storage, such as hard disk drives, as well as volatile data storage, such as random access memory ("RAM") (25). There is also usually provided a local set of user interface devices (display, mouse, keyboard, etc.) or a remote user interface (23) for user and administrator access to the system. Most computers are also equipped with a network interface card ("NIC") (27) to allow communications (21) via a computer network.

Software provided on the computer includes a Basic Input/Output System (BIOS) and set of hardware device drivers (28) accompanied by an operating system (203). A user interface or "environment" (201) with a set of utilities (29) are also provided.

According to the preferred embodiment, the computer is an IBM S/390 mainframe computer, the operating system is IBM's OS/390, and the user interface, environment and utilities are ISPF.

Figure 3:
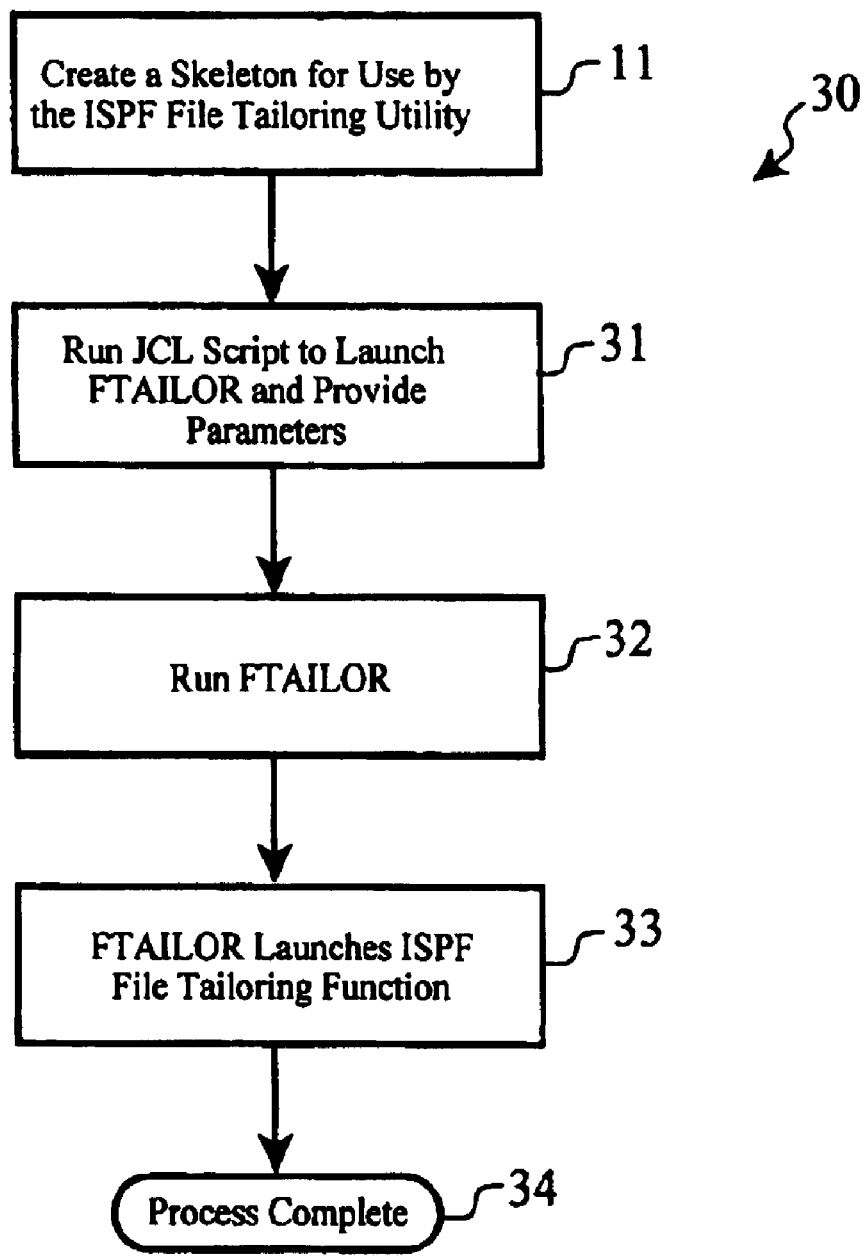
FIG. 3 discloses the high level logical process of using the invention.

Turning now to FIG. 3, the high level logical process of using the invention is shown. First, a skeleton or template is created (11) to define the output for the ISPF standard File Tailoring Function ("FTF").

Next, a short JCL script is run (31) to invoke the invention, FTAILOR, and to pass it parameters it needs to find the source data, create a plurality of input tables, and invoke FTF as needed to accomplish the operation.

During execution of the FTAILOR program, FTF is invoked (33) one or more times, passing it the skeleton and the created input tables as input.

Figure 4:
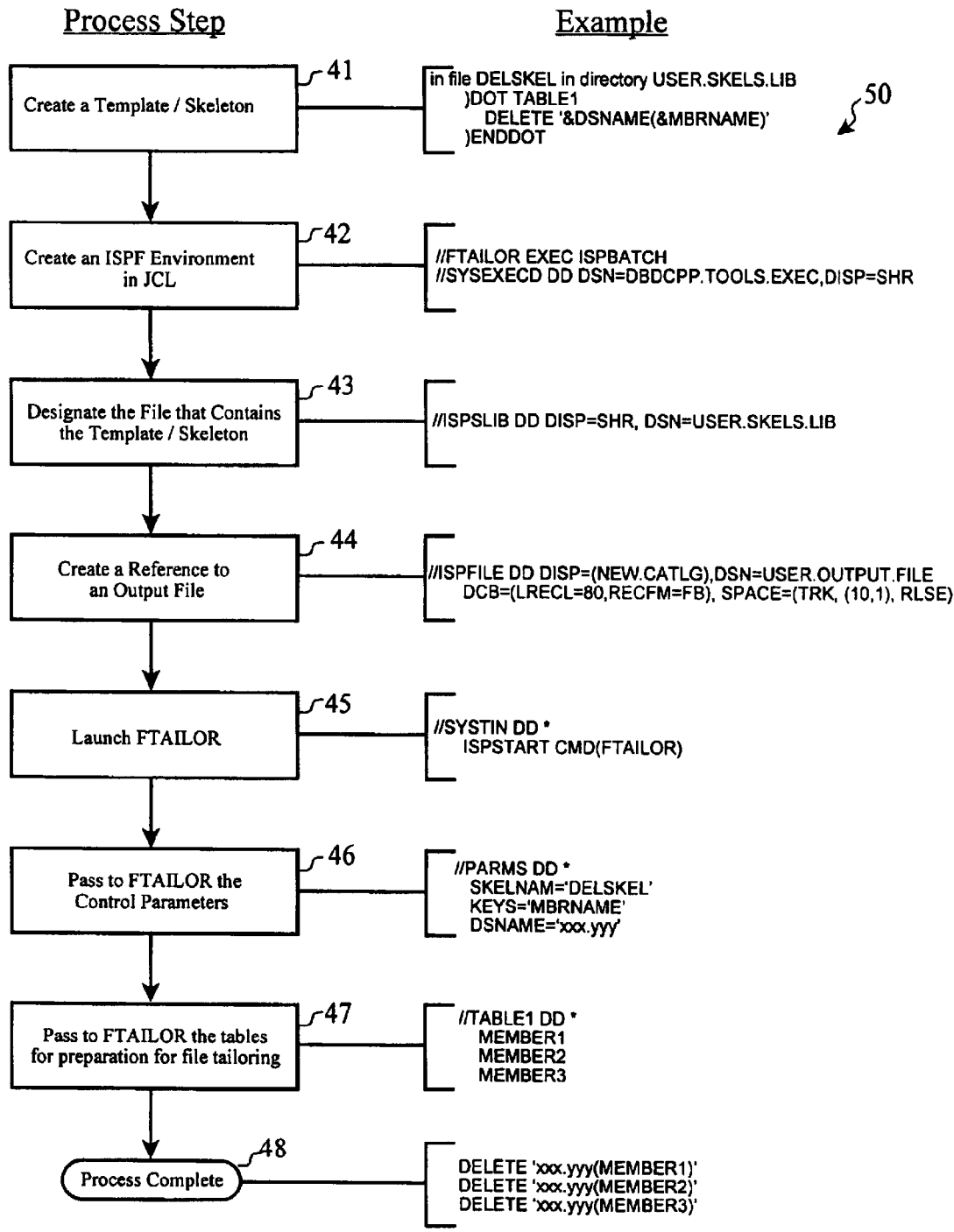
FIG. 4 illustrates with example JCL how the invention is invoked.

Turning now to FIG. 4, more details of the JCL program which controls the invention FTAILOR are given, accompanied by example JCL statements:

(41) First, a skeleton (template) is created, such as a file named DELSKEL in the PDS (directory or folder) "USER.SKELS.LIB";

(42) an ISPF environment is created using JCL;

(43) the skeleton (template) file is designated including its disposition as being "shared", also in JCL;

(44) the output file is also designated with its format parameters and disposition; and

(45) next, the new FTAILOR process is invoked, passing to it parameters including the name of the skeleton file, keys, and a data set name (46), as well as the source data or "members" which FTAILOR is to prepare for tailoring (47).

Several of the example JCL DD statements must be present in all of the JCL used to invoke the invention, which include the following:

(a) a SYSEXEC statement, which designates the PDS (directory or folder) which contains the FTAILOR executable program;

(b) a SYSIN statement which contains the PSPSTART CMD(FTAILOR) statement to invoke the FTAILOR executable program;

(c) an ISPSLIB designating the PDS (directory or folder) which contains the ISPF skeletons;

(d) a PARMS statement containing a list of parameters for FTAILOR;

(e) an ISPFILE statement designating the output dataset; and (f) a TABLEx statement designating an input dataset to be converted to an ISPF table by the FTAILOR program.

Other optional DD statements may be used as desired, including:

(g) an ECHOx statement which causes each row written to the ISPF table TABLEx to also be written to a file ECHOx;

(h) an EACHx statement which causes the REXX commands in a file named "EACHx" to be executed for each row of data in TABLEx;

(i) a PFAILx statement which provides certain criteria for inclusion in table TABLEx, wherein the file "PFAILx" must contain REXX language assignments to variables PASS and FAIL such that records which cause the variable PASS to be true are included in the table TABLEx, otherwise the records are discarded (e.g. not included in table TABLEx);

(j) a DISCARD statement which establishes a method to collect all the records discarded by the PFAILx statement; and (k) a PARMx statement which sets parameters only for table TABLEx.

When steps 42 through 47 are encoded into JCL, the proper input and output files are established, the input or source data is processed by FTAILOR to create the requisite ISPF tables, and the ISPF's FTF functions perform the actual file tailoring (as called by FTAILOR). Also, in this notation, a parameter or statement ending in "x" such as TABLEx, PARMx, etc., represents one or more parameters or statements where "x" is an integer from 1 to 99. This allows, for example, up to 99 tables to be passed to FTAILOR (e.g. TABLE1, TABLE2, ... TABLE 99) defining table layouts in up to 99 parameter sets (PARM1, PARM2, ... PARM99).

In the example given here, FTAILOR will create in the ISPFILE dataset one delete statement for each membername (as specified in the keys) listed in TABLE 1 as follows:

DELETE 'XXX.YYY(MEMBER1)'

DELETE 'XXX.YYY(MEMBER2)'

DELETE 'XXX.YYY(MEMBER2)'

While this is a relatively simple example, and does not necessarily illustrate the savings of manual effort to generate only three delete statements, it could just as easily process a set of input tables with options that results in hundreds or thousands of ISPF FTF commands.

Figure 5:
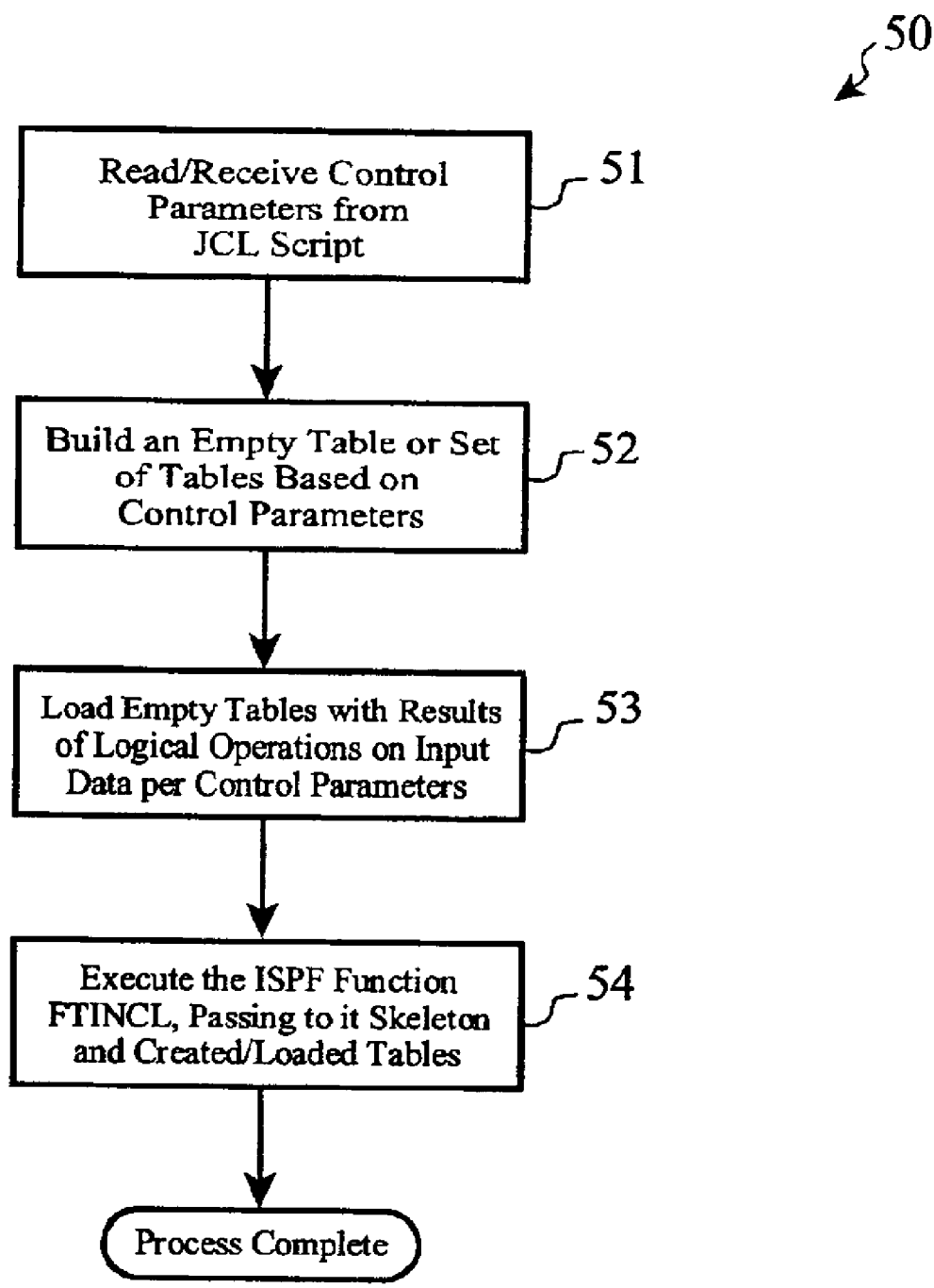
FIG. 5 sets forth the fundamental logical process of the invention.

Turning to FIG. 5, the logical process (50) of the FTAILOR program is shown, which is preferably written in the well-known REXX language, but could alternatively be written in other programming languages common to these types of computer environments such as PL1.

First, FTAILOR reads (51) the parameters passed to it by the controlling JCL script. Next, it builds (52) empty tables based upon the these parameters, and loads (53) these tables with data from the indicated source files or members according to the passed-in parameters. Finally, the standard ISPF FTF function "FTINCL" or utility is invoked on the loaded tables, supplying FTINCL with the user-defined skeleton.

FTINCL is a standard function or service provided in the ISPF environment, and the invention FTAILOR utilizes it to invoke the ISPF's native file tailoring operations. The ISPF FTINCL service specifies the skeleton that is to be used to produce the file tailoring output, and it automatically opens (FTOPEN) and closes (FTCLOSE) the related files and invokes the ISPF file tailoring functions on the supplied tables of data. The ISPF services FTINCL, FTCLOSE and FTOPEN are well known among database administrators, as they are often used directly in the custom programs written for specific operations.

The inherently invoked ISPF FTOPEN service begins the actual file tailoring process, allowing skeleton files to be access from a skeleton library as specified by the ISPSLIB statement in the example JCL. The output of the FTOPEN services is normally the file allocated to the "ddname" using the ISPFILE statement in the example JCL.

Table 1 sets forth the PARMS parameters for FTAILOR according to the preferred embodiment.

TABLE 1

| FTAILOR PARMS | |
|---|---|
| SKELNAME | The name of the skeleton (template) to be included. |
| KEYS | Key fields for the ISPF table to be created. Tokens 1 through n of the input dataset will be parsed into the first n keys in the KEYS statement. |
| NAMES | The names of the non-key fields in the generated ISPF table. After the key fields are parsed from the input file the remaining tokens will be parsed into NAMES. |
| STATS | For an input file, STATS = YES will set the ISPF Z* parameters for each file. Default is STATS = NO. |
| DEBUG | If YES, every input command processed will be written to SYSTSPRT. Default is NO. |
| PDSMEMNM | If ISPFILE is a directory, PDSMEMNM will contain the PDS output member name to create. Default is the first key value. |
| SKIP | Number of tokens to skip at beginning of input file. If SKIP = 1, for example, parsing will begin with token 2. |
| GROUPBY | Create multiple ISPF tables from the input file. group by is set to the key that contains the table name. |
| DELIM | Parse character delimiter. Default is blank delimited tokens. |
| PARSENUM | Number of input tokens to parse into the KEYS and NAMES variables. |
| OLDTAB | If YES, the ISPF table already exists in ISPTABL. |
| FAILURE | If ABEND, then abend the job anytime a PFAILx statement causes a failure. |
| ABEND_RC | Default is 16. May be set to any other integer. |
| CASE | If MIXED, allow mixed case, otherwise fold to uppercase. |
| COMMENT | Comment indicator for the input file. Default is *, i.e., any record in the input file beginning with * is treated as a comment. |
| XLAT | Optional translation. For example XLAT = 'X Y' will change all Xs to Ys in the input file. |
| MARGIN | Default is 72. Indicates end of input record. |
| TRUNC | If YES, strip each input word. |
| EMPTY | If OK, FTAILOR continues processing if no input found. If not OK, FTAILOR ends with an rc = 1. |
| SORT | If not N, the ISPF tables generated are sorted in key order. |

Further according to the preferred embodiment, the ISPFILE output file may be either a PS or PDS. If it is a PS, then FTINCL is called once to create the sequential output file. If it is a PDS and the MEMBER parameter has been set, then FTINCL is called once to create the output in the specified member. If the ISPFILE is a PDS but the MEMBER parameter has not been set, then FTINCL is called once for each entry in the input file. The member name may be either the value of the PDSMEMNM parameter if it has been set, or the name of the first key field in the input record.

The TABLE 1 DD statement contains the input records to be parsed into the KEY and NAMES, which are then loaded into the ISPF table named "TABLE 1". The following consideration are made during the loading of TABLE 1:

(a) If TABLE 1 is a PS dataset or a member of a PDS, the each record in TABLE 1 is parsed into the ISPF table;

(b) If TABLE 1 is a PDS, each member name in TABLE 1 is parsed into the KEY field and stored in the ISPF table;

(c) If two or more records in TABLE 1 contains the same key, any non-blank values in the current record will be copied into blank values in the existing ISPF table row; and (d) If GROUPBY has been set, then multiple ISPF tables will be create, one for each key, in which the NAMES fields in each table will be equal to the NAMES that have been set in the PARMS dataset.

Further according to the preferred embodiment, an EACHx statement may be used so that the REXX logic and statements in the file called "EACHx" is performed before writing each record to the output ISPF table TABLEx.

It will be understood from the foregoing description that various modifications and changes may be made in the preferred embodiment of the present invention without departing from its true spirit, such as the use of alternate programming methodologies or languages, alternate microprocessor architectures, and software development tool sets. It is intended that this description is for purposes of illustration only and should not be construed in a limiting sense. The scope of this invention should be limited only by the language of the following claims.

What is claimed is:

1. A method for preprocessing data comprising the steps of:

receiving a set of data preprocessing control parameters prior to performing said file tailoring on source data, said preprocessing control parameters indicating options for preprocessing a plurality of source data sets in preparation for subsequent file tailoring operations;

building a plurality of empty tables based upon said preprocessing control parameters, each empty table corresponding to one or more of said source data sets;

processing each set of source data to load said empty tables according to said preprocessing control parameters; and subsequent to loading each table, invoking native file tailoring on said loaded tables to produce a desired set of tailored files.

2. The method as set forth in claim 1 wherein said step of processing comprises executing a REXX™ program.

3. The method as set forth in claim 1 wherein said step of receiving a set of data preprocessing control parameters comprises receiving a parameter selected from the group of a key field parameter, a skeleton file pointer parameter, a "stats" parameter, a "skip" parameter, a "parsenum" parameter, a "xlat" parameter, a "margin" parameter, a "trunc" parameter, an "empty" parameter, and a "sort" parameter.

4. The method as set forth in claim 1 wherein said step of invoking comprises the step of invoking an Interactive System Productivity Facility file tailoring service.

5. A computer readable medium encoded with software for preprocessing data, said software performing the steps of:

receiving a set of data preprocessing control parameters prior to performing file tailoring on source data, said preprocessing control parameters indicating options for preprocessing a plurality of source data sets in preparation for subsequent file tailoring operations;

building a plurality of empty tables based upon said preprocessing control parameters, each empty table corresponding to one or more of said source data sets;

processing each set of source data to load said empty tables according to said preprocessing control parameters; and subsequent to loading each table, invoking native file tailoring on said loaded tables to produce a desired set of tailored files.

6. The computer readable medium as set forth in claim 5 wherein said software for processing comprises software for executing a REXX™ program.

7. The computer readable medium as set forth in claim 5 wherein said software for receiving a set of data preprocessing control parameters comprises software for receiving a parameter selected from the group of a key field parameter, a skeleton file pointer parameter, a "stats" parameter, a "skip" parameter, a "parsenum", a "xlat" parameter, a "margin" parameter, a "trunc" parameter, an "empty" parameter, and a "sort" parameter.

8. The computer readable medium as set forth in claim 5 wherein said software for invoking comprises software for invoking an Interactive System Productivity Facility file tailoring service.

9. A system for preprocessing data comprising:

a data preprocessor configured to receive a set of source data prior to tailoring of said source data:

a controller for invoking said data preprocessor, said controller providing a set of preprocessing control parameters to said data preprocessor;

a set of tables initially created in an empty state and subsequently loaded by said data preprocessor according to said preprocessing control parameters, prior to invoking native file tailoring on said loaded tables to obtain a set of tailored files.

10. The system as set forth in claim 9 wherein said data preprocessor comprises a REXX™ executable script.

11. The system as set forth in claim 9 wherein said controller comprises a Job Control Language (JCL) script.

12. The system as set forth in claim 9 wherein both the controller and the data preprocessor are configured to cooperate with an Interactive System Productivity Facility environment.

13. The system as set forth in claim 9 wherein said data preprocessor is configured to receiving a preparation control parameter selected from the group of a key field parameter, a skeleton file pointer parameter, a "stats" parameter, a "skip" parameter, a "parsenum" parameter, a "xlat" parameter, a "margin" parameter, a "trunc" parameter, an "empty" parameter, and a "sort" parameter.

14. The system as set forth in claim 9 wherein said data preporcessor is configured to invoke Interactive System Productivity Facility file tailoring services.

* * * * *